(12) United States Patent
Ramachandra et al.

(10) Patent No.: US 9,424,309 B2
(45) Date of Patent: Aug. 23, 2016

(54) METHOD FOR OPTIMIZING PERFORMANCE OF DATABASE/WEB-SERVICE BACKED APPLICATIONS BY AUTOMATICALLY PREFETCHING QUERY RESULTS

(71) Applicant: Indian Institute of Technology Bombay, Mumbai (IN)

(72) Inventors: Karthik Ramachandra, Mumbai (IN); Sundararajarao Sudarshan, Mumbai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 268 days.

(21) Appl. No.: 14/149,978

(22) Filed: Jan. 8, 2014

(65) Prior Publication Data
US 2014/0195512 A1 Jul. 10, 2014

Related U.S. Application Data

(60) Provisional application No. 61/750,532, filed on Jan. 9, 2013.

(51) Int. Cl.
*G06F 7/00* (2006.01)
*G06F 17/30* (2006.01)

(52) U.S. Cl.
CPC .............................. *G06F 17/30457* (2013.01)

(58) Field of Classification Search
CPC .......... G06F 17/30457; G06F 11/3664; G06F 12/0897; G06F 12/0875; G06F 9/3851; G06F 8/4442
USPC .......... 707/708, 713, 741; 711/137, 151, 154, 711/158; 717/129, 141, 158, 161
See application file for complete search history.

(56) References Cited

U.S. PATENT DOCUMENTS

| 2003/0023955 | A1* | 1/2003 | Bates ................. G06F 11/3664 717/129 |
| 2014/0101278 | A1* | 4/2014 | Raman .................... G06F 9/528 709/213 |

\* cited by examiner

*Primary Examiner* — Md. I Uddin
(74) *Attorney, Agent, or Firm* — Pepper Hamilton LLP

(57) ABSTRACT

The present disclosure proposes the method for optimizing the performance of data base/web-service backed applications by automatically prefetching query results. The proposed system and methods automatically insert prefetch instructions at the earliest possible points across procedure calls in application source code, in presence of conditional branching and loops. A data flow analysis technique called anticipable expressions analysis is extended, to analyze anticipability of queries. The benefit of prefetching is limited due to the presence of assignment statements and conditional branches that precede the query execution statement. Enhancements such as code motion, chaining and rewriting prefetch requests are devised to increase benefits of prefetching. These techniques perform equivalence preserving program and query transformations.

13 Claims, 13 Drawing Sheets

```
void generateReport(int custId, int curr, String fromDate){
($n_1$)    ResultSet a=executeQuery("SELECT *
                        FROM accounts
                        WHERE custId=?", custId); // q1
($n_2$)    while(a.next()){
($n_3$)        int accountId = a.getInt("accountId");
($n_4$)        processAccount(a);
($n_5$)        processTransactions(accountId, fromDate);
           }

($n_6$)    ResultSet c = executeQuery("SELECT *
                        FROM customers
                        WHERE custId=?", custId); // q2
($n_7$)    processCustomer(c);

($n_8$)    if(curr != DEFAULT_CURR){
($n_9$)        ResultSet s=executeQuery("SELECT exchgRate
                        FROM exchange
                        WHERE src=? AND dest=?",
                        {curr, DEFAULT_CURR}); // q3
($n_{10}$)     printExchangeRate(s, curr);
           }
} void processTransactions(int accId, String from){
($n_{11}$)   int startingBalance = getBalanceAsOf(from, accId);
($n_{12}$)   int balance = startingBalance;

($n_{13}$)   ResultSet t=executeQuery("SELECT *
                        FROM transactions
                        WHERE accountId=? AND date > ?
                        ORDER BY date", {accId, from}); // q4
($n_{14}$)   while(t.next()){
($n_{15}$)       balance = processTransaction(t, balance);
           }
}
```

FIG. 1

```
void generateReport(int custId, int curr, String fromDate){
    submit(q2, custId);
    submitChain({q1, q4'}, {{custId}, {fromDate}});
    // q4' denotes query q4 with its first ? replaced
    // by :q1.accountId.

boolean b = (curr != DEFAULT_CURR);
    if(b) submit(q3, {curr, DEFAULT_CURR});

... // code unchanged (lines n_1 to n_7)
    if(b){
        ... // code unchanged (lines n_9, n_10)
    }
}
```

FIG. 2

```
procedure InsertPrefetchRequests(CFG G)
begin
   remove all critical edges by edge splitting
   Q = {all query execution statements in G}
   perform QueryAnticipabilityAnalysis on G w.r.t Q for each Stmt q ∈ Q do begin
      for each Node n ∈ CFG G do begin
         if $(Out_{n,q} \cap \neg In_{n,q})$ then begin
            //Case 1: data dependence barrier
            appendPrefetchRequest(n, q)
         else if $(In_{n,q} \cap \neg \bigcup_{m \in pred(n)} Out_{m,q})$
            //Case 2: control dependence barrier
            prependPrefetchRequest(n, q)
         endif
      endfor
   endfor
end
```

FIG. 4

| Node | Local Information | | Global Information | | | |
| --- | --- | --- | --- | --- | --- | --- |
| | | | Iteration #1 | | Iteration #2 | |
| | $Gen_n$ | $Kill_n$ | $Out_n$ | $In_n$ | $Out_n$ | $In_n$ |
| End | 000 | 000 | 000 | 000 | | |
| $n_{10}$ | 000 | 000 | 000 | 000 | | |
| $n_9$ | 001 | 000 | 000 | 001 | | |
| $n_8$ | 000 | 000 | 000 | 000 | | |
| $n_7$ | 000 | 000 | 000 | 000 | | |
| $n_6$ | 010 | 000 | 000 | 010 | | |
| $n_5$ | 000 | 000 | 111 | 111 | 010 | 010 |
| $n_4$ | 000 | 000 | 111 | 111 | 010 | 010 |
| $n_3$ | 000 | 000 | 111 | 111 | 010 | 010 |
| $n_2$ | 000 | 000 | 010 | 010 | | |
| $n_1$ | 100 | 000 | 010 | 110 | | |
| Start | 000 | 111 | 110 | 000 | | |

FIG. 5

```
void generateReport(int custId, int curr, String fromDate){
        submit(q2, custId);  // prefetch q2
        submit(q1, custId);  // prefetch q1

(n₁)    ResultSet a=executeQuery("SELECT *
                        FROM accounts
                        WHERE custId=?", custId); // q1
(n₂)    while(a.next()){
(n₃)        int accountId = a.getInt("accountId");
(n₄)        processAccount(a);
(n₅)        processTransactions(accountId, fromDate);
        }

(n₆)    ResultSet c = executeQuery("SELECT *
                        FROM customers
                        WHERE custId=?", custId); // q2
(n₇)    processCustomer(c);

(n₈)    if(curr != DEFAULT_CURR){
            // prefetch q3
            submit(q3, {curr, DEFAULT_CURR});

(n₉)        ResultSet s=executeQuery("SELECT exchgRate
                        FROM exchange
                        WHERE src=? AND dest=?",
                        {curr, DEFAULT_CURR}); // q3
(n₁₀)       printExchangeRate(s, curr);
        }
} void processTransactions(int accId, String from){
        submit(q4, {accId, from});
(n₁₁)   int startingBalance = getBalanceAsOf(from, accId);
(n₁₂)   int balance = startingBalance;

(n₁₃)   ResultSet t=executeQuery("SELECT *
                        FROM transactions
                        WHERE accountId=? AND date > ?
                        ORDER BY date", {accId, from}); // q4
(n₁₄)   while(t.next()){
(n₁₅)       balance = processTransaction(t, balance);
        }
}
```

FIG. 7

```
procedure      InsertInterproceduralPrefetchRequests
(CallGraph CG)
begin
   rts = {Vertices of CG sorted in reverse topological order}
   for each Vertex v ∈ rts do begin
      // run the modified intraprocedural algorithm
      InsertPrefetchRequests(cfg(v))

s = Entry(cfg(v)) // the first statement of procedure v
      while isPrefetchStatement(s) do begin
         remove(s,v) //remove s from procedure v
         callSites = {cfg(src(e)) | e ∈ CG and dest(e) == v}
         for each CFG cs ∈ callSites do begin
            t = {all invocations of v in cs} for each Stmt c ∈ t do begin
               // replace formal parameters in s with their
               // actual counterparts in c
               replaceParameters(s, c)
               prependPrefetchRequest(s, t)
            endfor
         endfor
         s = Entry(cfg(v))
      endwhile
   endfor
end
```

FIG. 8

```
void generateReport(int custId, int curr, String fromDate){
    submit(q2, custId);  // prefetch q2
    submit(q1, custId);  // prefetch q1 boolean b = (curr != DEFAULT_CURR);
    if(b) submit(q3, {curr, DEFAULT_CURR});

($n_1$)    ResultSet a=executeQuery("SELECT *
                       FROM accounts
                       WHERE custId=?", custId);  // q1
($n_2$)    while(a.next()){
($n_3$)        int accountId = a.getInt("accountId");
               submit(q4, {accountId, fromDate});//prefetch q4
($n_4$)        processAccount(a);
($n_5$)        processTransactions(accountId, fromDate);
           }
($n_6$)    ResultSet c = executeQuery("SELECT *
                       FROM customers
                       WHERE custId=?", custId);  // q2
($n_7$)    processCustomer(c);

($n_8$)    if(b){
($n_9$)        ResultSet s=executeQuery("SELECT exchgRate
                       FROM exchange
                       WHERE src=? AND dest=?",
                       {curr, DEFAULT_CURR});  // q3
($n_{10}$)     printExchangeRate(s, curr);
           }
}
```

FIG. 9 void *submitChain*(*queries, params*)
where
- *queries*: Array of query strings
- *params*: Array of arrays of parameters for the queries, other than chaining parameters.

FIG. 10

*submitChain* ({"SELECT * FROM accounts
         WHERE custId=?",
       "SELECT * FROM transactions
         WHERE accountId = :q1.accountId
           AND date > ?"},
       {{custId},{fromDate}});

FIG. 11

SELECT *
FROM (SELECT * FROM accounts WHERE custId = ?)
    OUTER APPLY
    (SELECT * FROM transactions
      WHERE transactions.accountId = account.accountId
        AND date > ?)

FIG. 12

| Query Executions | Applicable Algorithm | | |
|---|---|---|---|
| | Intra | Inter | Enhancements |
| 100 | 32 | 63 | 16 |

FIG. 17 ously, that is calling application issues the request and blocks during stages (b), (c), (d) and (e). Once the results are achieved, the application continues its execution. Thus the queries are sent to the database sequentially, one followed by the other. Such synchronous execution of queries or web service requests results in a lot of latency (delay) due to network round trips and input and output (IO) at the database. Much of the effects of latency can be reduced if these actions are overlapped with local computations or other requests. Such overlap can be achieved by issuing asynchronous requests in advance, while the application continues performing other tasks. In many cases, the results can be made available by the time they are actually required, thereby completely hiding the effect of latency. This idea of making query results available before they are actually needed by the application is called query result prefetching.

METHOD FOR OPTIMIZING PERFORMANCE OF DATABASE/WEB-SERVICE BACKED APPLICATIONS BY AUTOMATICALLY PREFETCHING QUERY RESULTS

CLAIM OF PRIORITY

This non-provisional patent application claims the benefit of priority to U.S. Provisional Application Ser. No. 61/750, 532, filed Jan. 9, 2013, entitled "METHOD FOR OPTIMIZING PERFORMANCE OF DATABASE/WEB-SERVICE BACKED APPLICATIONS BY AUTOMATICALLY PREFETCHING QUERY RESULTS," which is hereby incorporated by reference in its entirety.

TECHNICAL FIELD

The present disclosure relates to a method for efficient performance of database/web-service applications. In particular, the present disclosure relates to a method for optimizing performance of database/web-service applications by automatically inserting prefetch instructions in application source code of the database application.

BACKGROUND

Applications on the web spend part of their execution time on local computation and spend the rest in accessing databases, web services or other applications remotely. For any remote access, there is a conversation between an application server and a database/web service in the form of a requests (SQL queries/HTTP requests) and responses. In such applications, the time taken for remote access is split between (a) preparing requests, (b) transmitting them over the network, (c) actual computation at the database, to serve the request [(involving processing and disk input and output (IO)], (d) preparing responses, (e) transmitting responses back over the network.

BRIEF DESCRIPTION OF THE DRAWINGS

FIG. 1 shows a program with prefetching opportunities according to an example embodiment.

FIG. 2 shows a program with prefetch requests according to an example embodiment.

FIG. 4 shows an algorithm for the Intraprocedural prefetch insertion according to an example embodiment.

FIG. 5 shows the data for query anticipability analysis for method generatereport of FIG. 1 according to an example embodiment.

FIG. 7 shows the result of algorithm InsertPrefetchRequests on FIG. 1 according to an example embodiment.

FIG. 8 shows an algorithm for the Interprocedural prefetch insertion according to an example embodiment.

FIG. 9 shows the output of an algorithm for InsertInterproceduralPrefetchRequests on FIG. 1 (with code motion) according to an example embodiment.

FIG. 10 shows a submitChain interface code according to an example embodiment.

FIG. 11 shows a code for Chaining of q1 and q2 of FIG. 8 according to an example embodiment.

FIG. 12 shows a prefetch query rewrite for FIG. 10 according to an example embodiment.

FIG. 17 shows the results of the analysis for applicability of prefetching according to an example embodiment.

DETAILED DESCRIPTION

Figure 3:
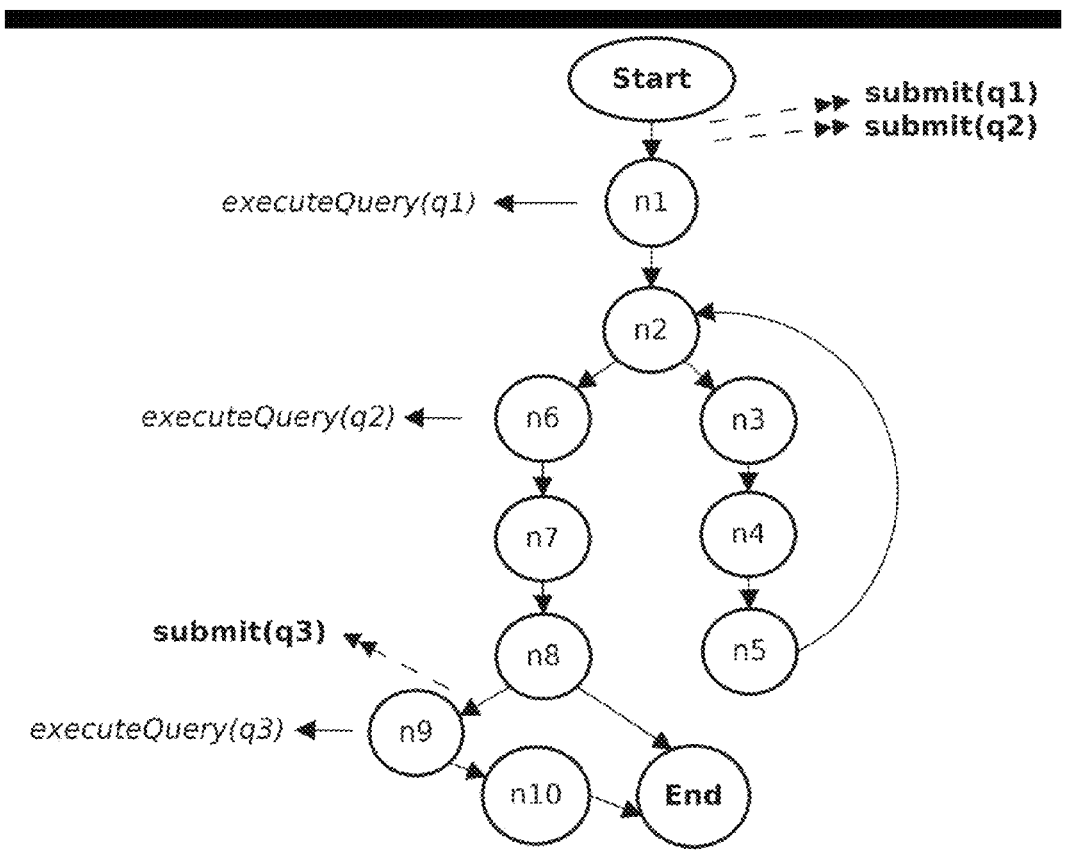
FIG. 3 shows the CFG for method generateReport of FIG. 1 according to the example embodiment.

In the following description, for purposes of explanation, numerous specific details are set forth in order to provide a thorough understanding of some example embodiments. It will be evident, however, to one skilled in the art that the present disclosure may be practiced without these specific details.

Applications on the web spend part of their execution time on local computation and spend the rest in accessing databases, web services or other applications remotely. For any remote access, there is a conversation between an application server and a database/web service in the form of a requests (SQL queries/HTTP requests) and responses. In such applications, the time taken for remote access is split between (a) preparing requests, (b) transmitting them over the network, (c) actual computation at the database, to serve the request [(involving processing and disk input and output (IO)], (d) preparing responses, (e) transmitting responses back over the network.

Usually, these actions are performed synchronously, that is calling application issues the request and blocks during stages (b), (c), (d) and (e). Once the results are achieved, the application continues its execution. Thus the queries are sent to the database sequentially, one followed by the other. Such synchronous execution of queries or web service requests results in a lot of latency (delay) due to network round trips and input and output (IO) at the database. Much of the effects of latency can be reduced if these actions are overlapped with local computations or other requests. Such overlap can be achieved by issuing asynchronous requests in advance, while the application continues performing other tasks. In many cases, the results can be made available by the time they are actually required, thereby completely hiding the effect of latency. This idea of making query results available before they are actually needed by the application is called query result prefetching.

Query result prefetching can be done manually, and is in fact used in many applications. However, manually identifying the best points in the code to perform prefetching is hard and time consuming, because of the presence of loops and conditional branches; it is even harder in situations where the query is invoked in some procedure P, but to get any benefit the prefetch should be done in another procedure Q which calls P. Manually inserted prefetching is also hard to maintain as code changes occur.

Optimization of the application may require the optimization of database access in the application, by means of rewriting the application code. Such optimization spanning the application and the database has been referred to as holistic optimization. The present disclosure focuses on automatic rewriting application programs to issue prefetches effectively and the techniques proposed in the present disclosure improve the applicability of prefetching.

An object of the present disclosure is to provide a method for optimizing performance of database/web-service backed applications by automatically prefetching query results.

Another object of the present disclosure is to insert asynchronous prefetch instructions for the queries/Web service requests at the earliest possible point in the source code of a database application that remotely accesses database or web services.

Still another object of the present disclosure is to provide an idea of analyzing program source code with the knowledge of query execution statements and web service API invocations.

Yet another object of the present disclosure is to provide an idea of using anticipable expressions analysis to analyze anticipability of query executions or web service invocations, by modeling them as expressions.

Yet another object of the present disclosure is to provide a novel algorithm which statically inserts prefetch instructions at the earliest possible point across procedure calls, in presence of conditional branching and loops.

Yet another object of the present disclosure is to provide an idea of transitive code motion to increase the length of execution paths between two given program statements (the prefetch instruction and the query execution statement).

Furthermore, another object of the present disclosure is to provide an idea of chaining and merging of prefetch requests in order to achieve more overlap and reduce latency.

A method for optimizing performance of database/web-service backed applications is proposed and described here, which includes a technique to automatically insert prefetch instructions at the earliest possible point across procedure calls in application source code, in presence of conditional branching and loops. To this end, a data flow analysis technique called anticipable expressions analysis is extended, to analyze anticipability of queries. The present disclosure includes techniques such as code motion, chaining, and rewriting prefetch requests and these techniques are devised to increase benefits of prefetching. These techniques perform equivalence preserving program and query transformations.

The present disclosure will be well understood from the following description in connection with the accompanying drawings in accordance with the various embodiments of the present disclosure.

FIG. 1 shows a program with prefetching opportunities according to an example embodiment. The generateReport method accepts a customer id (custId), a currency code (curr), and a date (fromDate), and performs the following tasks in sequence: (i) Retrieves information about all accounts of that customer and processes them in a loop ($n_1$ to $n_5$), (ii) Retrieves and processes customer information ($n_6$ and $n_7$), (iii) If the supplied currency code doesn't match the default(DEFAULT CURR), it fetches and displays the current exchange rate between the two ($n_8$ to $n_{10}$), (iv) The loop that processes accounts also invokes a method process Transactions for every account, which retrieves all tractions after the, fromDate for processing, after retrieving the balance as of fromDate ($n_{11}$ to $n_{15}$). In order to keep the listing simple, the present disclosure uses the methods processAccount and processCustomer to denote all the processing that happens on account and customer data.

FIG. 2 shows the transformed program with prefetch submissions. FIG. 2 uses symbols q1, q2 etc. to denote actual query strings, and omits lines of code that remain unchanged.

First consider query q2, whose parameter is available at the very beginning of generateReport. The proposed transformations prefetch the query result by invoking submit (q2, custId) at the beginning of generateReport as shown in FIG. 2; submit is a non-blocking call which initiates prefetching of query results to a cache and returns immediately. Thus, execution of q2 gets overlapped with the execution of the loop starting at line $n_2$. The query q3 is executed only if the predicate in line $n_8$ is true. The proposed transformations deal with this situation by issuing a prefetch conditional on the predicate in line $n_8$. Similarly, query q4 in the method processTransactions can be prefetched in the method generateReport just after line $n_3$, which is the earliest point where its parameters are available. In this case, the proposed transformations allow prefetch to be done in a calling procedure. As a further optimization, the parameter accountId of q4, which becomes available in line $n_3$, is really a result of query q1, and q4 is executed for every row in the result of q1. The proposed transformations therefore combine the prefetching of q1 and q4 by invoking the submitChain procedure as shown in FIG. 2. The procedure prefetches multiple queries, where parameters of later queries come from results of earlier queries; it initiates prefetch of a query once queries that it depends on have been prefetched. As yet another optimization, the procedure submitChain can combine the queries into a single prefetch query to the database.

The terminologies used and their background in accordance with the present disclosure is described below:

First, the Prefetch execution model in accordance with an example embodiment is described. The following execution model for prefetching are assumed:

There exists a cache of query results. This cache is keyed by the tuple (queryString, parameterBindings), and contains a result set. Every prefetch instruction sets its query results into this cache. If the prefetch query execution results in an exception, the exception is cached. The semantics of the methods are defined:

execute Query: This is a blocking function which first checks if the (queryString, parameterBindings) being issued, already exists in the cache. If so, it returns the cached results, else blocks till the results are available. If the cached result is an exception, it is thrown at this point.

submit: This is a non-blocking function which submits a query for execution and returns immediately. This is primarily the function which we use for issuing a prefetch.

Additionally, a variant of submit called submit-Chain is defined, which handles chaining of prefetch requests.

Following are the data structures that are used in the analysis according to an example embodiment.

The Control Flow Graph (CFG) is a directed graph that represents all paths that might be traversed by a program during its execution. In a control flow graph each node represents a basic block (a straight-line piece of code without branches). In an embodiment, one CFG is used per procedure, and one statement per basic block for simplicity. There are two specially designated nodes: the Start node, through which control enters into the flow graph, and the End node, through which all control flow leaves. Additionally, for each node n, Entry (n) and Exit (n) represent the program points just before the execution of the first statement, and just after the execution of the last statement of n. Directed edges represent control flow; the predecessor and successor relationships are as defined below:

succ(n): The successors set of node n in the CFG, G is the set of all nodes n2 such that there exists an edge from n to n2 in G. i.e. succ(n)={n2|n2 ∈ G and n→n2}
pred(n): The predecessors set of node n in the CFG, G is the set of all nodes n2 such that there exists an edge from n2 to n in G. i.e. pred(n)={n2|n2 ∈ G and n2→n}

CFGs are usually built on intermediate representations such as Java bytecode. The techniques used in the present disclosure are applicable to any CFG. The implementation according to the present disclosure uses CFGs built on a representation called Jimple, provided by the SOOT optimization framework. The CFG for FIG. 1 is shown in FIG. 3.

A call graph (also known as a call multi-graph) is a directed graph that represents calling relationships between methods in a program. Specifically, each node represents a method and each edge (f, g) indicates that method f calls method g. In addition, each edge also stores the program point of invocation of g in f and has the mapping of formal to actual variables. A cycle in the graph indicates recursive method calls. It is currently assumed that the Call Graph is a directed acyclic graph (DAG), as the proposed algorithms do not handle recursive method calls.

The general framework of data flow analysis in accordance with the present disclosure is described. Data flow analysis is a program analysis technique that is used to derive information about the run time behavior of a program. For a given program entity e, such as an expression a*b, data flow analysis of a program involves two steps:
 i. Discovering the effect of individual program statements one (called local data flow analysis). This is expressed in terms of sets $Gen_n$ and $Kill_n$ for each node n in the CFG of the program. $Gen_n$ denotes the data flow information generated within node n i.e., the set $Gen_n$ contains the expression a*b if node n computes a*b. $Kill_n$ denotes the information which becomes invalid in node n i.e., the expression a*b is said to be killed in node n if n has an assignment to a or b. The values of $Gen_n$ and $Kill_n$ are computed once per node, and they remain unchanged.
 ii. Relating these effects across statements in the program (called global data flow analysis) by propagating data flow information from one node to another. This is expressed in terms of sets $In_n$ and $Out_n$, which represent the data flow information at Entry (n) and Exit (n) respectively.

The specific definitions of sets $Gen_n$, $Kill_n$, $In_n$ and $Out_n$ depend upon the analysis. The definitions of the sets are described in the forthcoming section. The relationship between local and global data flow information is captured by a system of data flow equations. The nodes of the CFG are traversed and these equations are iteratively solved until the system stabilizes, i.e., reaches a fixpoint. Data flow analysis captures all the necessary interstatement data and control dependences about e through the sets $In_n$ and $Out_n$. The results of the analysis are then used to infer information about e.

The query anticipability analysis in accordance with an embodiment of the present disclosure is described. Referring to FIG. 1, the programs with query executions embedded within them, along with loops, branching, and other imperative constructs are considered. Prefetching of queries involves inserting query submission requests at program points where they were not present in the original program. The goal is to insert asynchronous query prefetch requests at the earliest possible points in the program so that the latency of network and query execution can be maximally overlapped with local computation. Suppose a query q is executed with parameter values v at point p in the program. The earliest possible points e where query q could be issued are the set of points where the following conditions hold: (a) all the parameters of q are available, (b) the results of executing q at points e and p are the same, and (c) conditions (a) and (b) do not hold for predecessors of e. For efficiency reasons, an additional constraint is imposed that no prefetch request should be wasted. In other words, a prefetch request for query q with parameters v should only be inserted at earliest points where it can be guaranteed that q will be executed subsequently with parameters v.

Detecting earliest possible points for queries in the presence of multiple query execution statements, while satisfying the above constraints, may require a detailed analysis of the program. The presence of conditional branching, loops and method invocations lead to complex interstatement data and control dependences which are often not explicit in the program. For solving this problem, the present disclosure uses a data flow analysis framework called anticipable expressions analysis and extend it to compute query anticipability. Anticipable expressions analysis is a data flow analysis technique that is used for eliminating redundant computations of expressions. The Anticipable expressions analysis can facilitate expression motion, which involves advancing computation of an expression to earlier points in control flow paths. This analysis is typically used for expressions with binary operators to detect earlier points in the program where they can be moved.

The analysis proposed in the present disclosure differs from anticipable expressions analysis in the following aspects: (a) Insertion of prefetch instructions, not code motion (b) Computing and propagating data flow information for query execution statements as against expressions.

The scope of this analysis is intraprocedural i.e., this analysis is used to find query anticipability within a procedure.

The analysis proposed in the present disclosure is defined below:
 A query execution statement q is anticipable at a program point u if every path from u to End contains an execution of q which is not preceded by any statement that modifies the parameters of q or affects the results of q.

Query anticipability analysis is a data flow framework with query execution statements being the data flow values (program entities of interest). All required data flow information for this analysis may be compactly represented using bit vectors, where each bit represents a query execution statement. For a query execution statement q, the sets (bit vectors) $Gen_n$ and $Kill_n$ are defined as follows:
 $Gen_n$ is 1 at bit q if n is the query execution statement q.
 $Kill_n$ is 1 at bit q if either n contains an assignment to a parameter of q, or performs an update to the database that may affect the results of q.

Conservatively, it is assumed that any update to the database affects the results of q; this assumption can be removed by performing interquery dependence analysis. Query anticipability computation may require propagation of data flow information against the direction of control flow. The data flow information at Exit (n) (i.e., $Out_n$) is computed by merging information at Entry of all successors of n. The data flow equations for query anticipability analysis are:

$$In_n = (Out_n - Kill_n) \cup Gen_n \quad (1)$$

$$Out_n = \begin{cases} \phi & \text{if n is End node} \\ \bigcap_{s \in succ(n)} In_s & \text{otherwise} \end{cases} \quad (2)$$

In equation 1, $In_n$ is defined in terms of $Out_n$, $Gen_n$ and $Kill_n$. $Out_n$ is defined in equation 2 by merging the In values of all successors of n using set intersection (∩) as the merge operator. $Out_{End}$ is i initialized to be φ as query executions are not anticipated at Exit (End).the intersection (∩) is used to capture the notion that the query execution statement is anticipable at $Out_n$, only if it is anticipable along every path from n to End. $In_n$ and $Out_n$ for all other nodes are initialized to the universal set.

The nodes of the CFG are traversed in reverse topological order and the values of $Out_n$ and $In_n$ are calculated for each node; this process is repeated until the system reaches a fixpoint.

For a given query execution statement q, query anticipability analysis discovers a set of anticipability paths. Each such path is a sequence of nodes $(n_1, n_2 \ldots n_k)$ such that:

- $n_k$ is the query execution statement q,
- $n_1$ is either Start, or contains an assignment to some parameter of q, or performs an update to the database,
- no other node in the path contains an execution of q, or an assignment to any parameter of q, or an update to the database
- q is anticipable at every node in the path.

Anticipability can be blocked by the presence of critical edges in the CFG. A critical edge is an edge that runs from a fork node (a node with more than one successor) to a join node (a node with more than one predecessor). Such a critical edge is removed introducing a new node along the edge such that the new node has no other predecessor other than the fork node. Removal of critical edges is a standard technique used in code motion optimization, and it increases anticipability at least along one path.

The query anticipability analysis is illustrated with an example, and how this analysis feeds into the proposed prefetching algorithm, to identify earliest points for issuing prefetches across methods is described.

Algorithm for inserting query prefetch instructions in a program in accordance to an embodiment of the present disclosure is described below. An algorithm to place prefetch requests at earliest points within a procedure is described initially. Subsequently, an algorithm that inserts prefetches across procedures is described.

To begin with, the algorithm for inserting prefetch instructions within a procedure, which is called as intraprocedural prefetching, is discussed. Following assumptions are made about the input procedure:

- Statements have no hidden side-effects. All reads and writes performed by a statement are captured in the $Gen_n$ and $Kill_n$ sets. Importantly the reads and writes of variables within method invocations, the effects of global variables and shared data structures, are also captured.
- The parameters to the query are primitive data type (int, float etc.) or strings. However, the techniques proposed in the present disclosure can be extended to arrays and objects.
- For simplicity of notation, the query execution statement is assumed to be of the form execute Query (sqlQuery, parameterBindings) where the sqlQuery is a string and the parameterBindings is an array of primitive data types. This is a simplifying assumption and can be easily removed to make the underlying CFG aware of the data access API used. The proposed implementation works on Java programs that use JDBC API, and hence is JDBC-API aware.

The algorithm, shown in FIG. 4 accepts the CFG of a procedure as input and returns a modified CFG with prefetch requests inserted. The operation of the algorithm is described with the example illustrated in FIG. 1. Consider the method generateReport, which embeds 3 queries labeled q1, q2 and q3. The corresponding CFG, which indicates execute Query nodes, is shown in FIG. 3. The methods processAccount, processCustomer and printExchangeRate do not involve any updates to the database that may invalidate the query results.

Algorithm InsertPrefetchRequests proceeds as follows:

First, as a preprocessing step, "critical" edges are removed by introducing new nodes along them. In the proposed example, the CFG remains unchanged as there are no critical edges. Then, all query execution statements are collected in a set Q, which forms the structure of the proposed bit vector used for query anticipability analysis. In the example, Q={q1, q2, q3}.

The values of the sets $Gen_n$ and $Kill_n$ for each node are computed first. KillStart is defined as 111 in the proposed example since the Start node assigns values to all parameters of the procedure. OutEnd is initialized to φ (000), with $In_n$ and $Out_n$ initialized to the universal set (111 in the example) for all other nodes. Then the fixpoint is computed as described before. In the example, the values converge in 2 iterations. The results of performing query anticipability analysis on FIG. 1 are shown in FIG. 5. FIG. 5 shows only the changed values in iteration #2.

This analysis provides the information about all points in the procedure where queries are anticipable. However, there is need to find the earliest point where the query is anticipable. There are two cases to consider arriving at the earliest point of anticipability, shown in FIG. 6 with statements denoted by s1, s2, s3, and sq and paths in the CFG denoted by dashed arrows.

The first case to consider arriving at the earliest point of anticipability is shown in FIG. 6(a). CASE 1: As shown in FIG. 6(a), s1 prevents the prefetch from being placed above it, due to an assignment to x. Such barriers due to assignments to query parameters or updates to the database that affect the query result are called data dependence barriers, since it is a data dependence that prevents the prefetch to be placed before this barrier.

More formally, if query q is not anticipable at Entry (n), but is anticipable at Exit (n), the prefetch statement is inserted immediately after n. This indicates that n is the initial node of an anticipability path for q. In the example, this case applies for queries q1 and q2 since they are not anticipable at $In_{Start}$ but become anticipable at $Out_{Start}$ as indicated by FIG. 5.

CASE 2: The second case to consider arriving at the earliest point of anticipability is shown in FIG. 6(b). As shown in FIG. 6(b), sq is control dependent on s1, since the predicate evaluated at s1 determines whether or not control reaches sq. The prefetch for q cannot be moved to s1 since the path s1→s2 does not issue the query subsequently. Such barriers due to conditional branching (if-then-else) are called control dependence barriers, since it is a control dependence that prevents the prefetch from being moved earlier. If query q is anticipable at Entry (n) and is not anticipable at the Exit of any of the predecessors of n, the prefetch statement is inserted immediately before n. In the example, this case applies for query q3, as indicated in FIG. 5 at $Out_{n8}$ and $In_{n9}$.

In the proposed algorithm, $In_{n,q}$ and $Out_{n,q}$ represent the anticipability of q at $In_n$, and $Out_n$ respectively. The procedures appendPrefetchRequest and prependPrefetchRequest accept a node n and a query execution statement q, prepare the prefetch instruction for q, and insert it immediately after or before n respectively. There can be multiple points in a program where a prefetch can be issued for a query q as there could be multiple paths reaching q from Start. The output of Algorithm InsertPrefetchRequests on both methods generateReport and processTransactions is shown in FIG. 7. Also, the CFG of method generateReport shown in FIG. 3 indicates the points where prefetch submissions are placed relative to the points where they are in the original program. The prefetch for query q2 has been placed at the beginning of the procedure beyond the loop. Query q3 cannot be moved before $n_8$ as it is not anticipable along the path $n_8 \rightarrow$ End.

The parameters to submit ( ) call in FIG. 7 are actual query strings, and the symbols q1, q2 etc. have been used only as a reference for readability of the description.

Now, the algorithm that inserts prefetches across procedures, called as Interprocedural prefetching is described.

The benefit of prefetching can be greatly increased by moving prefetches across method invocations. For instance, consider the query q4 in method processTransactions in FIG. 1, which is executed with parameters accId and from. The method processTransactions is invoked from generateReport (line $n_5$), and the accountId used in q4 is available right after $n_3$. Query q4 can be submitted for prefetch in generateReport, right after $n_3$, thereby overlapping it with the method processAccount. The potential benefit here is much greater than if the prefetch could only be done in the method where the query is executed. To extend the proposed algorithm in order to perform interprocedural prefetching is shown below:

The proposed algorithm can handle arbitrary levels of nesting, and can move the prefetch instruction across these levels while preserving the preconditions. The proposed algorithm currently cannot handle recursive method calls i.e., it is assumed that the Call Graph is a DAG.

The interprocedural prefetch insertion algorithm InsertInterproceduralPrefetchRequests is shown in FIG. 8.

The input to the algorithm is the call graph of the program, along with the CFGs of all the procedures involved. The intraprocedural algorithm InsertPrefetchRequests is used as a subroutine, after modifying it as follows: (i) The set Q of query execution statements now additionally considers prefetch requests of the form submit(sqlQuery, parameterBindings) where the sqlQuery is a string and the parameterBindings is an array of primitive data types. (ii) Before the point of invoking appendPrefetchRequest or prependPrefetchRequest, if q is a prefetch statement, it is removed from its original point. The key intuition behind the interprocedural algorithm is the fact that if a prefetch can be submitted at the beginning of a procedure, it can instead be moved to all its call sites. The vertices of the call graph are traversed in the reverse topological order, and InsertPrefetchRequests is invoked for the CFG of each vertex. Then, the first statement of the CFG is examined to see if it is a prefetch submission. If so, then the call graph is looked up for all the callsites, and the prefetch statement is inserted just before the method invocation of interest. This additionally may require the replacement of formal parameters in the prefetch statement, with the actual parameters in the call site. By traversing the call graph in reverse topological order, all successors of a vertex v are processed before processing v, thereby ensuring that no prefetch opportunities are lost. In the proposed example of FIG. 1, the modified intraprocedural algorithm is first run on processTransactions, which brings the prefetch submission of query q4 to the beginning of the method as shown in FIG. 7. Then the call graph is looked up and the prefetch instruction is prepended to the method invocation on line $n_5$ of generateReport. As part of this, the parameters accId and from in processTransactions are replaced by accountId and fromDate in generateReport. Subsequently, the run of the modified intraprocedural algorithm on generateReport moves the prefetch of q4 to the point immediately after line $n_3$, as shown in FIG. 9.

Also, the intraprocedural algorithm additionally inserts prefetch requests for queries q1 and q2 at the beginning of generateReport. This is also indicated in the CFG in FIG. 3. Therefore, queries q1 and q2 can be moved to methods that invoke generateReport.

There are three enhancements to the proposed prefetching algorithm to increase the benefits of prefetching according to the embodiment of the present disclosure. These enhancements are discussed below in detail.

For instance, consider query q3 in FIG. 7, where the prefetch submission just precedes the query invocation, which would not provide any performance benefit. The enhancements described will allow the prefetch to be done earlier, allowing better performance. The enhancements are based on equivalence preserving program and query transformations.

First enhancement, the Transitive code motion in accordance with an embodiment of the present disclosure is described. The goal of prefetching is to hide the latency of query execution (due to network and disk IO) by overlapping them with local computations or other requests. In terms of the CFG, this means that the longer the length of the paths from the prefetch request P to the query execution statement Q, the more the overlap, and the more beneficial the prefetch. The distance between P and Q can be increased by transitively applying the code motion optimization.

Figure 6:
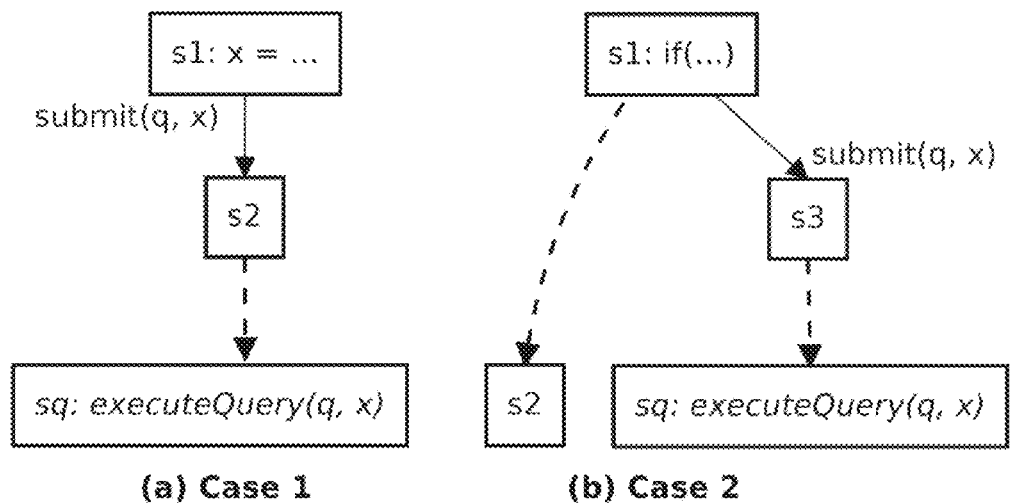
FIG. 6 shows the barriers for prefetching according to an example embodiment

The data and control dependence barriers that prevent the prefetch from being inserted earlier as shown in FIG. 6 has been described. Now a technique to increase the benefits of prefetching in presence of these barriers is presented below.

Whenever a barrier is encountered, following transformations are performed: (i) If a control dependence barrier is encountered, that control dependence is transformed into a data dependence using 'if-conversion', or equivalently by transforming them to guarded statements as discussed in; in either case, the control dependence barrier gets transformed into a data dependence barrier. (ii) If a data dependence barrier (assignment to a query parameter) is encountered, anticipability analysis on barrier statements is transitively applied and moves them to their earliest possible point, and recomputed the anticipability of the query. Such transitive movement of the barrier statement can allow the prefetch to be performed earlier. The present disclosure illustrates the transitive code motion with q3 in FIG. 7 as an example. Here, a control dependence barrier due to the predicate (currCode!=DEFAULT CURR) is encountered. This is transformed into a data dependence using a variable b to hold the value of the predicate. Now, an anticipability analysis of the predicate reveals that it could be placed at the beginning of the method, and a guarded prefetch submission is placed just after it. The output of transitive code motion on FIG. 7 is shown in FIG. 9. Among existing lines of code, only line $n_8$ is transformed to use the variable b.

Second enhancement, the Chaining Prefetch requests in accordance with an embodiment of the present disclosure is described. A commonly encountered situation in practice is the case where the output of one query feeds into another. This is an example of a data dependence barrier, as described before, where the dependence arises due to another query. For example say a query q1 forms a barrier for submission of q2, but q1 itself has been submitted for prefetch as the first statement of the method. As soon as the results of q1 become available in the cache, the prefetch request for q2 can be issued. This way of connecting dependent prefetch requests is called chaining According to the proposed execution model, the prefetch requests are asynchronously submitted. In this model, chaining can be visualized as a sequence of events and event handlers. A handler (or multiple handlers) is registered for every query.

As soon as the results of a query are available, an event is fired, invoking all the handlers that subscribe to this event. These event handlers (which can be thought of as callback functions) pick up the results and issue prefetch submissions for subsequent queries in the chain. The event handlers themselves raise events which in turn trigger other handlers, which goes on till the chain is complete. Such a chain is set up as follows:

Suppose there is a set of queries (q1, q2 . . . qk), such that qi forms a barrier for qi+1. Let the set pi denote the results of qi that form the parameters to qi+1. Let $p_0$ denote the parameters for q1. Now, at the point of prefetch of q1, this chain of prefetches is initiated by registering handlers for each query. The set pi (which we call as the set of chaining parameters) is passed to the handler that executes query qi+1. The program is rewritten to use the API method submitChain ( ) whenever a query result is found to be a data dependence barrier. This makes the rewrite straightforward. The signature and semantics of the submitChain method are shown in FIG. 10.

Chaining parameters (i.e. parameters that come from the result of an earlier query) are represented as: qi .attrname, in the query string itself. This kind of chaining can be extended to iterative execution of queries in a loop, where the following conditions hold: (i) the parameters of the query in the loop (say qloop) are from the results of a previous query that is outside the loop (say qouter), (ii) the loop iterates over the all the tuples in the results of qouter, (iii) qloop is unconditionally executed in every iteration of the loop. Such cases are commonly encountered in practice. For instance, queries q1 and q2 in FIG. 9 satisfy these conditions. Once the dependence between q2 and q1 are identified, along with the chaining parameter, the submitChain API method is invoked as shown in FIG. 11. Once the first query in the chain executes, the second query is issued for all the accountId values returned by the first query.

Third enhancement, the Rewriting Prefetch requestss in accordance with an embodiment of the present disclosure is described Chaining by itself can lead to substantial performance gains, especially in the context of iterative query execution whose parameters are from a result of a previous query. Chaining collects prefetch requests together, resulting in a set of queries with correlations between them. Such queries can be combined and rewritten using known query decorrelation techniques. In order to preserve the structure of the program, the results of the merged rewritten query are then split into individual result sets and stored in the cache according to the individual queries. FIG. 12 shows the rewritten query for queries in the chain of FIG. 11, using the OUTER APPLY syntax of SQL Server. Rewriting not only reduces round trips of query execution, but also aids the database in choosing better execution plans. The resulting code achieves the advantages of batching without having to split the loop. It can perform better than batching since the overhead of creating a parameter batch is avoided.

The working of the proposed transformation with loop fission integration in accordance with the present disclosure is discussed below.

The proposed prefetching algorithm can be used as a pre-processing step to apply the loop fission transformation as follows:

Consider the case where a query execution is deeply nested within a method chain, with a loop in the outermost method. Algorithm InsertInterproceduralPrefetchRequests brings the prefetch statement up the method call hierarchy into the method with the loop whenever possible. At this point, if the preconditions for prefetch chaining and rewrite are not satisfied, the loop fission transformation can be applied. Also, loop fission is not applicable if the query execution is part of a cycle of true dependencies, and is very restricted in the presence of exception handling code. In many such cases, the proposed techniques are applicable and beneficial.

The working of the proposed transformation with Hibernate and Web services in accordance with the present disclosure is discussed below.

A lot of real world applications are backed by persistence frameworks such as Hibernate, or by data sources exposed through Web services (e.g. Amazon, Twitter etc.). Programs that use Hibernate rarely contain SQL queries directly embedded in application code. They invoke the API methods of Hibernate, which in turn generate the necessary SQL queries using the O/R mapping information provided in configuration files or annotations. Web services are typically accessed using APIs that wrap the HTTP requests and responses defined by the Web service.

Although the proposed algorithms in the context of programs that embed SQL queries have been described, the algorithms are more generic and applicable for a wider class of applications. To apply the proposed techniques for such applications effectively, (i) the proposed CFG has to be aware of the data access API in order to place prefetches appropriately, and (ii) there has to be runtime support to issue asynchronous prefetches for these data access methods. For example, querying in Hibernate is primarily done either by the use of HQL (Hibernate Query Language), or by the QBC (Query by Criteria) API, apart from native SQL queries. With some analysis, these API methods can be incorporated into the proposed CFG before the proposed prefetch insertion algorithm is executed.

The proposed implementation currently supports prefetching through asynchronous submission for JDBC API, a subset of the Hibernate API and the Twitter API, used in the experiments. Some databases and Web services provide asynchronous APIs for data access. The proposed transformation techniques can be tailored to use these APIs for prefetching.

The design of the proposed program rewriting system in accordance with present disclosure is described.

The proposed techniques are used with any language and data access API. These techniques have been implemented with Java as the target language. The proposed system has two components:

(i) A runtime library (Prefetch API) for issuing prefetch requests and managing the cache. This currently works with JDBC, a subset of Hibernate API, and the Twitter API. It uses the Executor framework of the java.util.concurrent package for thread scheduling and management. In the current implementation, the cache is a simple hash map, with eviction under program control.

(ii) A source-to-source program transformer which inserts prefetch API calls at appropriate points in a program. The transformer currently works with JDBC calls but can be easily extended for other data access APIs. The proposed prefetch insertion implementation operates on the CFG and the call graph of the input program, which is provided by the SOOT optimization framework. SOOT uses an intermediate representation called Jimple and provides the CFG, the data dependence information and also a framework for performing fixed point iteration required for query anticipability analysis. The proposed implementation inserts prefetch instructions in Jimple code, which is then translated back into Java. Since the proposed techniques cause minimal changes to the input program (mostly only insertion of prefetch method invocations), the readability of the transformed code is preserved.

The experiment evaluation and the corresponding results in accordance with the present disclosure are described below.

The benefits and applicability of the proposed techniques using four applications are evaluated: two publicly available benchmarks for database applications, one real world commercial ERP application, and another real world application using a Web service. The experiments have been performed with two widely used database systems—a commercial system called hereinafter SYS1, and PostgreSQL. In an example, the database servers run on 64 bit Intel Core-2 2.4 GHz machines with 4 GB of RAM. In an example, the Java applications run from a remote machine with a similar processor and memory configuration, connected to the database servers over a 100 Mbps LAN.

Experiment 1

Figure 13:
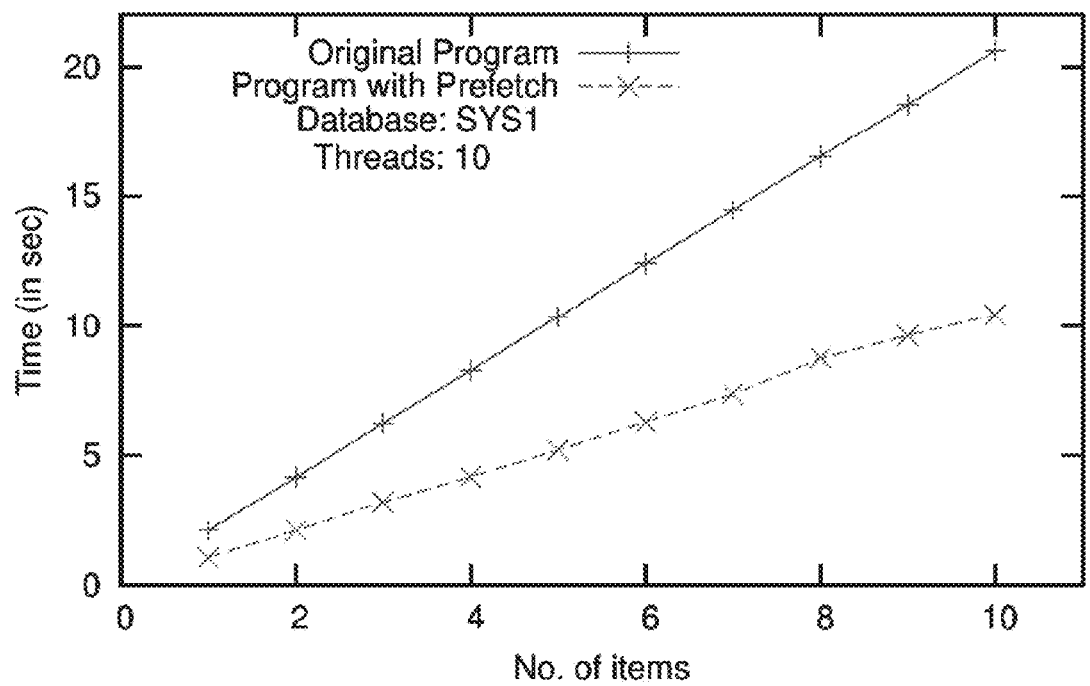
FIG. 13 shows a plot of the performance of JDBC application of an auction system before and after the transformation on SYS1 according to an example embodiment.

Referring to FIG. 13, the first experiment on Auction System (JDBC) and the results of the experiment in accordance with the present disclosure is described. A benchmark JDBC application called RUBiS that represents a real world auction system modeled after ebay.com is considered. The application has a nested loop structure in which the outer loop iterates over a set of items, and loads all the review comments about it. The inner loop iterates over this collection of comments, and for each comment loads the information about the author of the comment. Finally the outer loop executes an aggregate query to maintain author and comment counts. The comments table had close to 600,000 rows, and the users table had 1 million rows. In this experiment, only the intraprocedural prefetching of the aggregate query is performed. As a result, the prefetch instruction is placed before the inner loop, thereby achieving overlap of this loop. The impact of the proposed transformation is considered as the number of iterations of the outer loop is varied and fixing the number of threads at 10. FIG. 13 shows the performance of this program before and after the transformation on SYS1. The x-axis denotes the number of items that are processed (the iterations of the outer loop), and the y-axis shows the total time taken. FIG. 13 shows that about 50% improvement in the total time taken is consistently achieved.

Experiment 2

Figure 14:
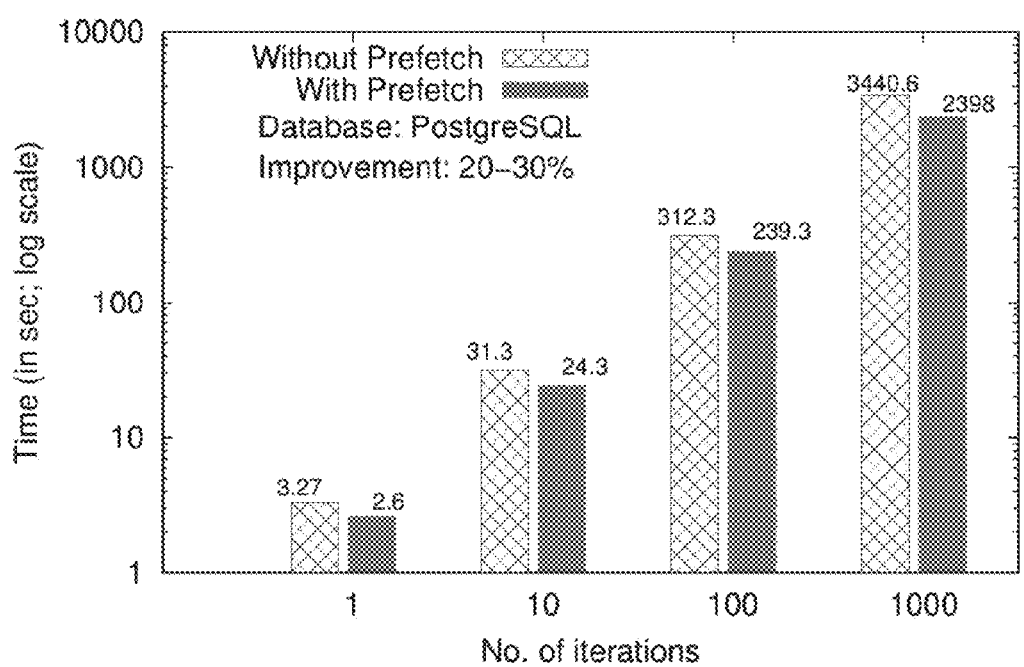
FIG. 14 shows a graph diagram of a plot showing the results of experiment conducted in Bulletin Board using the Hibernate API in log scale on PostgreSQL according to an example embodiment.

Referring to FIG. 14, the second experiment on Bulletin Board (Hibernate) and the results of the experiment in accordance with the present disclosure is described. RUBBoS is a benchmark bulletin board-like system inspired by slashdot.org. For this experiment the scenario of listing the top stories of the day, along with details of the comments made against them, using the Hibernate API for data access is considered. The program loads the top stories, and iterates on each to load the details. Finally, it loads the comments on those stories and all these operations happen in different methods of a class. There were close to 10000 stories and more than 1.5 million comments in the database. The prefetch requests are manually inserted according to the interprocedural prefetch insertion algorithm, since the proposed implementation currently transforms only JDBC calls. However, the runtime API have been extended to handle a subset of the Hibernate API, to issue asynchronous prefetches. The impact of the proposed transformation is considered as the number of iterations of the outer loop is varied and fixing the number of threads at 5. FIG. 14 shows the results of this experiment in log scale on PostgreSQL. The y-axis denotes the end-to-end time taken (in seconds; log scale) by the program to execute. The actual values of the time taken are displayed along with the plot and the reduction in time taken ranges from 20% to 30%.

Experiment 3

Figure 15:
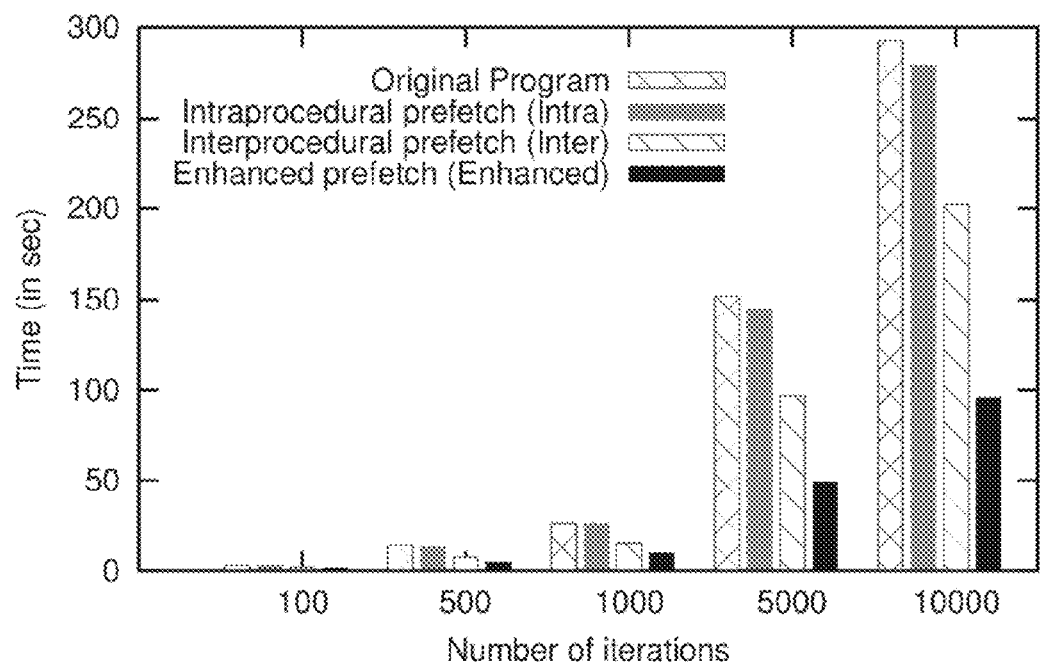
FIG. 15 shows a graph diagram of a plot showing the results of experiment conducted in ERP System on PostgreSQL according to an example embodiment.

Referring to FIG. 15, the third experiment on ERP System (JDBC) and the results of the experiment in accordance with the present disclosure is described. A popular commercial open source ERP application called Compiere and its community-developed fork called Adempiere are considered. Compiere is a Java application that uses JDBC. Consider the scenario of calculating taxes on orders with line items. Initially all the line items for an order are loaded (using a query q1) by invoking a method passing in the orderId. Then, for each item, a method is invoked to compute tax. This method loads the taxable amount and the type of tax applicable (using query q2), and returns the tax for that item. Finally, the tax for the order is computed by aggregating the taxes of all its line items. Here query q2 is present inside a method that is invoked from within a loop. The lineitems table had 150,000 rows. In this experiment, the impact of each of the techniques presented in the proposed disclosure is analyzed. First, the original program is executed. Then the proposed techniques, namely Intra (intraprocedural prefetching), Inter (interprocedural prefetching) are incrementally applied, and finally Enhanced which includes code motion and query rewrite. (For this experiment, code motion did not provide any benefits, so the benefit is purely due to query rewrite.) Query rewrite is currently done manually.

The results of this experiment on PostgreSQL are shown in FIG. 15. The y-axis denotes the end to end time taken for the scenario to execute, which includes the application time and the query execution time. The time taken for orders with number of line items (and thus the number of iterations) varying between 100 and 10000 are measured. It is observed that the Intra approach provides only moderate gains. Inter provides substantial gains (between 25-30%) consistently. The reason for the improvement is that prefetches of q1 and q2 were moved to the calling methods, achieving more overlap. However, the use of the Enhanced approach leads to much bigger gains (about 50% improvement over Inter). Enhanced approach is able to achieve such gains as it reduces roundtrips by merging the two queries.

Experiment 4

Figure 16:
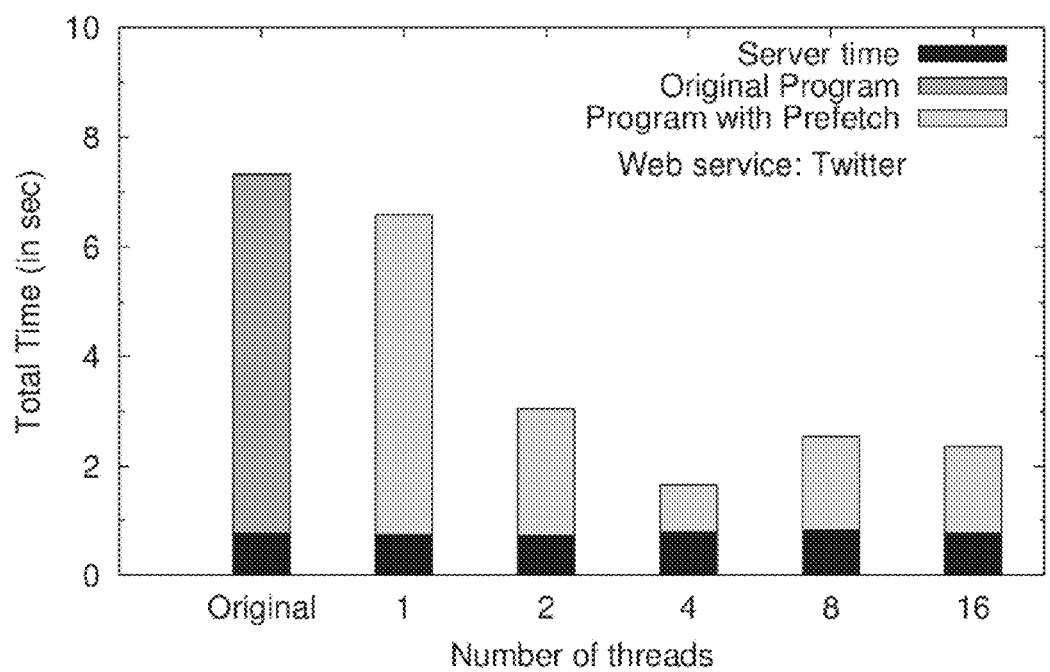
FIG. 16 shows a graph diagram of a plot showing the results of experiment conducted in Twitter according to an example embodiment.

Referring to FIG. 16, the fourth experiment on Twitter Dash Board (Web Service) and the results of the experiment in accordance with the present disclosure is described. In this experiment, an application that monitors a few keywords (4 keywords in the proposed example), and fetches the latest tweets about those keywords from Twitter, a real time information network is considered. The public information in Twitter can be accessed using an API using JSON over HTTP. The application, written in Java, uses the Twitter4j library to connect to Twitter, and fetch the latest tweets with the necessary keywords.

The proposed runtime prefetching library to work with Twitter requests is extended, and manually inserted the prefetch instructions in the input program according to the proposed interprocedural algorithm. The results of this experiment are shown in FIG. 16. Since the Twitter requests are now prefetched asynchronously, they overlap with each other and hence save a lot of the network round trip delay. The actual time taken at the Twitter servers is also reported along with the response, and has been shown in FIG. 16 as "Server time". The remaining time includes network latency and local computation time. It has been observed that the server time is almost the same for each case, but the total time taken decreases and reaches the minimum when 4 threads are used. At this point, more than 75% improvement in the total time taken is achieved. As the number of threads increase beyond 4, the total time taken increases. As the proposed example monitors 4 keywords, there is an overhead to maintaining additional threads and Twitter connections. Since this experiment was conducted on the live Twitter API on the Internet, the actual time taken can vary with network load. However, the relative improvement of the transformed program is expected to remain the same. This experiment shows the applicability of the proposed techniques beyond database query submission.

Applicability of the proposed prefetching in accordance with a present disclosure is described. In order to evaluate the applicability of the proposed prefetching techniques, Compiere (used in Experiment 3) is considered. A subset of the Compiere source code has been analyzed to find out how many query execution statements can be prefetched using the proposed techniques, and to what extent. The results of the analysis are presented in FIG. 17.

Out of 100 query execution statements, 32 were such that only intraprocedural prefetching was possible. In 63 cases, prefetches were moved only across methods. The enhancements were applicable in 16 cases. Prefetching was not possible in 5 cases. Overall, the proposed techniques are able to issue prefetches for 95% of the queries. The 32 cases where the prefetches were not able to be moved to calling methods were mainly due to conditional execution of queries, which prevents interprocedural prefetching.

In the proposed experiments the transformation took very little time (less than a second) for programs with about 150 lines of code.

Two algorithms for statically inserting prefetch instructions are presented above. Algorithm InsertPrefetchRequests uses query anticipability analysis and inserts prefetch instructions at the earliest points within a procedure, in the presence of conditional branching, loops and other intraprocedural constructs. Algorithm InsertInterproceduralPrefetchRequests combines this analysis and inserts prefetch instructions at the earliest possible points in the whole program, across method invocations. The proposed algorithms ensure the following: (i) No prefetch request is wasted. A prefetch is inserted at a point only if the query is executed with the same parameter bindings subsequently. (ii) All existing statements of the program remain unchanged. These algorithms only insert prefetch requests at specific program points and hence they are very non-intrusive. (iii) The transformed program preserves equivalence with the original program. The presence of conditional exits due to exceptions may result in query execution not being anticipable earlier in the program. Since such exits are rare and these exists can be chosen to ignore when deciding where to prefetch a query, at the cost of occasional wasted prefetches. This is chosen as the default option in the proposed implementation.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. Method for optimizing the performance of database/web-service backed applications by automatically prefetching query results, said method comprising:
    inserting, using at least one processor, prefetch instructions into an original program at the earliest point across procedure calls, wherein said prefetch instructions comprise dependent prefetch instructions and independent prefetch instructions;
    defining notion of query anticipability by extending anticipable expression analysis to query executions and web service invocations;
    defining notions of data and control dependence bathers, wherein said notions are used to identify to invalidate query anticipability;
    using results of said query anticipability analysis and combining them with control flow and data flow information of said original program to arrive at the earliest point where said prefetch instructions are safely inserted to generate a transformed program;
    wherein said prefetch instructions are moved across methods by combining said query anticipability analysis of individual methods; and
    wherein said transformed program preserves equivalence with the original program; and
    wherein said control dependence barriers are followed by transitive code motion to increase the length of execution paths between two given program statements, comprising said prefetch instruction and said query execution statement.

2. The method of claim 1, wherein said anticipable expression analysis facilitates expression motions by advancing computation of an expression to earlier points in a control flow graph (CFG).

3. The method of claim 2, further comprising using said anticipable expression analysis for eliminating redundant computations of expressions.

4. The method of claim 2 wherein said CFG includes a plurality of nodes.

5. The method of claim 2, wherein said CFG has call graph to represent calling relationships between methods in a program.

6. The method of claim 2, wherein at each node of said CFG, data is analyzed by data flow analysis technique; and sets $Gen_n$, $Kill_n$, $In_n$ and $Out_n$ depend upon said flow analysis.

7. The method of claim 6, further comprising using said data flow analyze technique with data barriers to prevent the prefetch instructions to be inserted before a control barrier.

8. The method of claim 1, wherein said control dependence barriers prevent the prefetch instructions from being moved earlier.

9. The method of claim 1, wherein a prefetch instruction is inserted at a point only if the query is executed with the same parameter bindings subsequently wherein a prefetch request is not wasted.

10. The method of claim 1, wherein said prefetch instructions are chained together, wherein said prefetch instructions comprise dependent prefetch instructions.

11. The method of claim 1, wherein said prefetch instructions are merged together; wherein said prefetch instructions comprise dependent prefetch instructions.

12. The method of claim 1, wherein all existing statements of the original program remain unchanged.

13. A system for optimizing the performance of database/web-service backed applications, the system comprising:
one or more processors;
a runtime library and a source-to-source program transformer module executable on the one or more processors configured to:
insert prefetch instructions into a program at the earliest point across procedure calls, wherein said prefetch instructions comprise dependent prefetch instructions and independent prefetch instructions;
define notion of query anticipability by extending anticipable expression analysis to query executions and web service invocations;
define notions of data and control dependence barriers, wherein said notions are used to identify to invalidate query anticipability;
use results of said query anticipability analysis and combine them with control flow and data flow information of said program to arrive at the earliest point where said prefetch instructions are safely inserted;
wherein said prefetch instructions are moved across methods by combining said query anticipability analysis of individual methods;
wherein said system uses any language and data API; and
wherein said control dependence barriers are followed by transitive code motion to increase the length of execution paths between two given program statements, comprising said prefetch instruction and said query execution statement.

* * * * *